United States Patent
Liu et al.

(10) Patent No.: US 10,936,431 B2
(45) Date of Patent: Mar. 2, 2021

(54) METHOD, DEVICE AND COMPUTER READABLE MEDIUM FOR RESTORING FILES

(71) Applicant: EMC IP Holding Company LLC, Hopkinton, MA (US)

(72) Inventors: Jie Liu, Chengdu (CN); Ningping Gou, Chengdu (CN); Ying Li, Chengdu (CN); Dening Xu, Chengdu (CN); Feng Ou, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 16/365,785

(22) Filed: Mar. 27, 2019

(65) Prior Publication Data

US 2020/0133788 A1 Apr. 30, 2020

(30) Foreign Application Priority Data

Oct. 26, 2018 (CN) .......................... 201811275059.6

(51) Int. Cl.
| | |
|---|---|
| *G06F 12/00* | (2006.01) |
| *G06F 11/14* | (2006.01) |
| *G06F 9/455* | (2018.01) |
| *H04L 29/08* | (2006.01) |

(52) U.S. Cl.
CPC ...... *G06F 11/1451* (2013.01); *G06F 9/45558* (2013.01); *H04L 67/34* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,145,989 B2* | 3/2012 | Kim | ................ G06F 8/61 715/200 |
| 2015/0046919 A1* | 2/2015 | Chen | ................ G06F 8/61 717/178 |

* cited by examiner

*Primary Examiner* — Jason W Blust
(74) *Attorney, Agent, or Firm* — Chamberlain, Hrdlicka, White, Williams & Aughtry

(57) ABSTRACT

Embodiments of the present disclosure relate to a method, device and computer readable medium for restoring files. The method described herein comprises: at a client, in response to receiving an instruction for restoring a set of files on a virtual machine from a backup server, obtaining a backup of a set of files from the backup server; transmitting information about the backup and a file downloading application to the virtual machine; causing the file downloading application to be executed on the virtual machine by transmitting an instruction for executing the file downloading application to the virtual machine, such that the virtual machine downloads the backup from the client based on the information about the backup.

15 Claims, 3 Drawing Sheets

METHOD, DEVICE AND COMPUTER READABLE MEDIUM FOR RESTORING FILES

CROSS REFERENCE TO RELATED APPLICATIONS

The application claims priority to Chinese Patent Application No. 201811275059.6 filed on Oct. 26, 2018. Chinese Patent Application No. 201811275059.6 is hereby incorporated by reference in its entirety.

FIELD

The present disclosure generally relate to file restoration, and more specifically to a method, device and computer readable medium for restoring files.

BACKGROUND

File-level restoration is one of mechanisms for restoring files on a virtual machine. Currently, in the file-level restoration, a client pushes a backup of a particular file or folder of a virtual machine on a backup server to the virtual machine by calling an application programming interface (API) for file restoration. Only one file at a time can be pushed by calling the API. In the case where the number of files to be restored is large, the API needs to be called once for each of the files to be restored. Thus, the performance of calling the API is low, thereby causing an inefficient process of file restoration.

SUMMARY

Embodiments of the present disclosure provide a method, device and computer readable medium for restoring files.

In a first aspect of the present disclosure, there is provided a method of restoring a file. The method comprises: at a client, in response to receiving an instruction for restoring a set of files on a virtual machine from a backup server, obtaining a backup of a set of files from the backup server of the set of files; transmitting information about the backup of the set of files and a file downloading application to the virtual machine; causing the file downloading application to be executed on the virtual machine by transmitting an instruction for executing the file downloading application to the virtual machine, such that the virtual machine downloads the backup of the set of files from the client based on the information about the backup of the set of files.

In some embodiments, the information about the backup of the set of files at least includes: an identification of the backup of the set of files, and a storage path of the backup of the set of files on the virtual machine.

In some embodiments, the method further includes: storing, at the client, the identification of the backup in association with an access path of the backup on the client.

In some embodiments, the method further includes: receiving, from the virtual machine, a request for downloading the backup of the set of files, the request comprising the identification of the backup of the set of files; based on the identification in the request, determining the access path of the backup of the set of files on the client; reading the backup of the set of files via the access path; and transmitting the virtual machine a download response which includes the backup of the set of files.

In some embodiments, the method further includes: in response to completion of the download, causing the virtual machine to remove information about the backup of the set of files and the file downloading application.

In a second aspect of the present disclosure, there is provided a method of restoring a file. The method comprises: at a virtual machine, receiving, from a client, information about a backup of a set of files on virtual machine, and a file downloading application; and in response to receiving an instruction for executing a file downloading application from the client, executing the file downloading application on the virtual machine to download the backup of the set of files from the client based on information about backup of the set of files.

In some embodiments, the information about the backup of the set of files at least includes: an identification of the backup of the set of files, and a storage path of the backup of the set of files on the virtual machine.

In some embodiments, executing the file downloading application on the virtual machine includes: generating a request for downloading the backup of the set of files based on information about the backup of the set of files; transmitting the request to the client, the request comprising an identification of the backup of the set of files; receiving from the client a download response which includes the backup of the set of files; and storing the backup of the set of files on the virtual machine via the storage path.

In some embodiments, the method further includes: in response to completion of the download, removing information about the backup of the set of files and the file downloading application.

In a third aspect of the present disclosure, there is provided an electronic device. The device includes at least one processor and at least one memory comprising computer program instructions. The at least one memory and computer program instructions are configured, together with the at least one processor, to cause the device to perform the steps of the method according to the first aspect.

In a fourth aspect of the present disclosure, there is provided an electronic device. The device includes at least one processor and at least one memory comprising computer program instructions. The at least one memory and computer program instructions are configured, together with the at least one processor, to cause the device to perform the steps of the method according to the second aspect.

In a fifth aspect of the present disclosure, there is provided a computer readable medium. The computer readable medium is tangibly stored on a non-volatile computer readable medium and includes machine executable instructions. The machine executable instructions, when executed, cause the machine to perform the steps of the method according to the first aspect.

In a sixth aspect of the present disclosure, there is provided a computer readable medium. The computer readable medium is tangibly stored on a non-volatile computer readable medium and includes machine executable instructions. The machine executable instructions, when executed, cause the machine to perform the steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

Throughout the drawings, the same or similar reference symbols refer to the same or similar elements.

DETAILED DESCRIPTION

Figure 1:
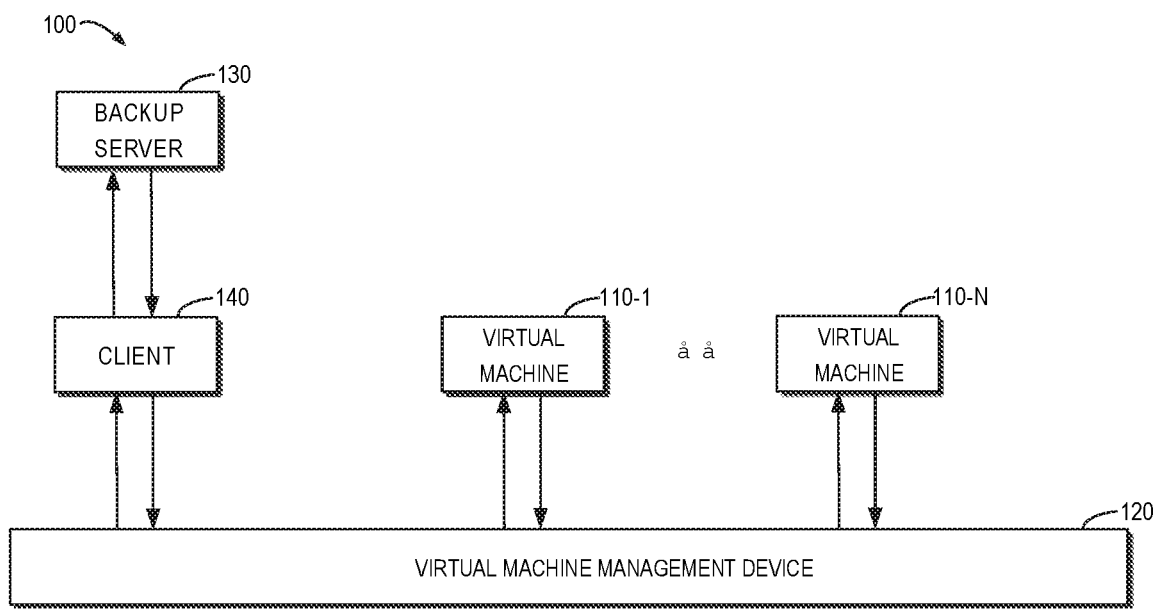
FIG. 1 illustrates a schematic diagram of an example data protection system in one or more embodiments of the present disclosure can be implemented.

Embodiments of the present disclosure will be described with reference to the drawings in detail. Though some embodiments of the present disclosure are shown in the drawings, it should be appreciated that the present disclosure can be implemented in various manners and should not be interpreted as limited to the implementations described herein. Conversely, these implementations are provided for thorough and complete understanding of the present disclosure. It is to be understood that the drawings and implementations are only for the purpose of example, rather than to limit the scope of protection of the present disclosure.

As used herein, the term "includes" and its variants are to be read as open terms that mean "includes, but is not limited to." Unless otherwise specified particularly, the term "or" represents "and/or". The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Traditionally, in the file-level restoration, a client of a backup server pushes a backup of a file of a virtual machine on the backup server to the virtual machine by calling an API provided by a file restoring system. Specifically, the client performs the following actions by calling the API for file transfer: transmitting a file restore request to a virtual machine management device, acquiring from the virtual machine management device a uniform resource locator (URL) for uploading a file to the virtual machine, and uploading a backup of the file to the URL in a pushing mode. As a result, the backup of the file is restored on the virtual machine.

However, in the case where a folder on the virtual machine is to be restored and the folder includes a large number of files, the API for file transfer has to be called once for each of the files in the folder to perform the above-described actions.

In addition, uploading a file to be restored to a virtual machine by calling the API is time consuming when the file is large. For example, if the file to be restored is 1 GB, it will take 1462 seconds to upload the file to the virtual machine. It can be seen that the performance of calling the API is low, causing an inefficient process of file restoration.

According to embodiments of the present disclosure, there is proposed a fast file restore solution. In the file restore solution, the client provides the virtual machine with information about the backup of a set of files to be restored and a file downloading application. The client causes the file downloading application to be executed on the virtual machine, so that the virtual machine downloads the backup from the client based on the information about the backup. With the file restore solution according to embodiments of the present disclosure, an operating system of a virtual machine can download the backup of files in the set of files to be restored from the client by executing the file downloading application without calling the API for file transfer once for each of the files in the set of files. As such, it is possible to reduce the number of times of API calls and improve the efficiency of restoring files.

Embodiments of the present disclosure will be specifically described below with reference to the figures.

FIG. 1 illustrates a schematic diagram of an example data protection system 100 in which a plurality of embodiments of the present disclosure can be implemented. It should be understood that the data protection system 100 shown in FIG. 1 is for illustrative purposes only and does not imply any limitation to the scope of the present disclosure. Embodiments of the present disclosure may be embodied in different structures.

As shown in FIG. 1, the data protection system 100 includes a set of virtual machines 110-1 through 110-N (hereinafter collectively referred to as virtual machines 110), wherein N is a natural number greater than one.

The data protection system 100 also includes a virtual machine management device 120. The virtual machine management device 120 is configured to manage the virtual machines 110. In some embodiments, the virtual machine management device 120 may be implemented as a server. For the sake of clarity, FIG. 1 only shows one virtual machine management device 120 managing one set of virtual machines 110, but it should be understood that there may be a plurality of virtual machine management devices 120 that manage multiple virtual machines or multiple sets of virtual machines, respectively.

In addition, the data protection system 100 further includes a backup server 130 and a client 140. The backup server 130 is configured to store a backup of files on the virtual machine 110. The client 140 is configured to be a proxy of the backup server 130 to implement backup and restoration of files on the virtual machine 110. In some embodiments, the backup server 130 may perform a backup operation for the files on the virtual machine 110 periodically or at a specified time via the client 140, and store the backup of the files in the backup server 130 for subsequent restoration.

In some embodiments, the client 140 implements certain operations for the virtual machine 110 by accessing the virtual machine management device 120. For example, the virtual machine management device 120 may provide a group of APIs, and the client 140 may invoke these APIs to cause the virtual machine 110 to perform predetermined operations.

Figure 2:
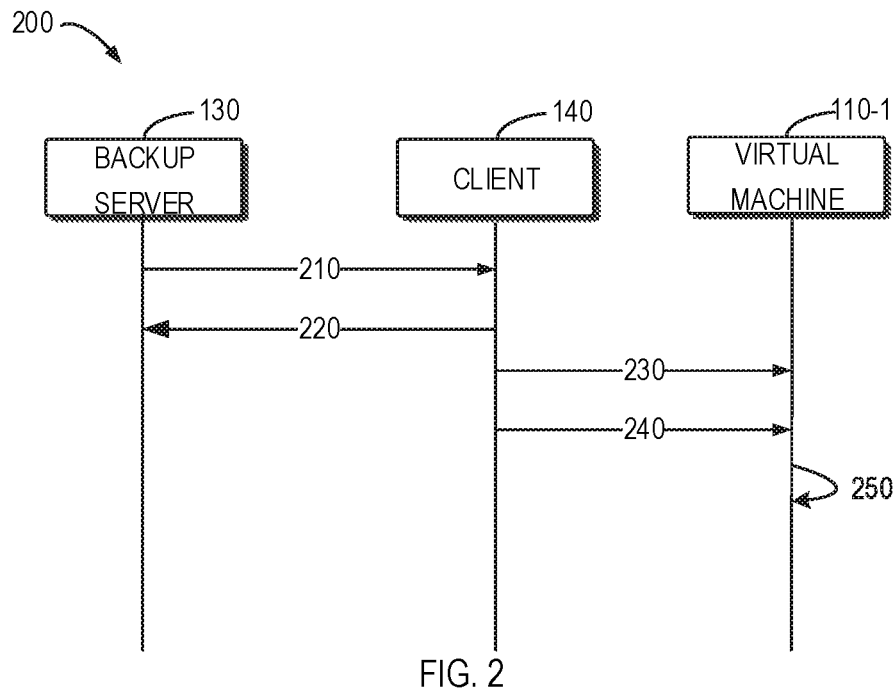
FIG. 2 illustrates a process for restoring files according to one or more embodiments of the present disclosure.

FIG. 2 illustrates a process 200 for restoring files according to some embodiments of the present disclosure. The process 200 may be performed, for example, by the backup server 130, the client 140, the virtual machine management device 120 and the virtual machine 110 as shown in FIG. 1. For ease of discussion, the description of the process 200 will be performed in conjunction with backup server 130, the client 140, and the virtual machine 110-1. It should be appreciated that the process 200 may also include additional actions not shown and/or may omit the illustrated actions, and the scope of the present disclosure is not limited in this respect.

The client 140 receives (210) from the backup server 130 instructions for restoring a set of files on the virtual machine 110-1. In some embodiments, the instructions for restoring the set of files on the virtual machine 110-1 may include an identification (ID) of the backup of the virtual machine 110-1 and a storage path of the set of files on the virtual machine 110-1. It will be appreciated that the backup of the virtual machine 110-1 may contain a backup of all files on the virtual machine 110-1.

The client 140 obtains (220) the backup of the set of files from the backup server 130. In some embodiments, the set of files may contain given files on the virtual machine 110-1. In other embodiments, the set of files may contain a given folder on the virtual machine 110-1, and the given folder may contain one or more files. In other embodiments, the set of files may contain given files as well as a given folder on the virtual machine 110-1.

In some embodiments, the client 140 may mount a storage device (not shown) of the backup server 130 to the client 140 by executing a mount application on the client 140. Thus, it is possible to browse the backup of the virtual machine 110-1 stored on the storage device on the client 140 to thereby obtain the backup of the set of files. It should be understood that, by mounting the storage device (not shown) of the backup server 130 to the client 140, only the backup of the virtual machine 110-1 can be browsed on the client 140, and the backup of the virtual machine 110-1 is not stored locally on the client 140.

The client 140 transmits (230) information about the backup of the set of files and a file downloading application to the virtual machine 110-1. Correspondingly, the virtual machine 110-1 receives, from the client 140, the information about the backup of the set of files on the virtual machine 110-1 and the file downloading application.

In some embodiments, the client 140 may transmit the information about the backup of the set of files and the file downloading application to the virtual machine 110-1 by invoking the API for file transfer. The API for file transfer may be any suitable API provided by the data protection system. For example, the API for file transfer may be an InitiateFileTransferToGuest API.

In some embodiments, the information about the backup of the set of files at least includes: an identification of the backup of the set of files and a storage path (hereinafter also referred to as a "target path") of the backup on the virtual machine 110-1. The identification of the backup of the set of files is used to uniquely identify the set of files during the restoration of the set of files. In some embodiments, the identification includes a globally unique identifier (GUID).

In some embodiments, the information about the backup of the set of files also includes information about access right of the set of files. In some embodiments, the client 140 transmits the information about the access right to the virtual machine 110-1. Thereby, the virtual machine 110-1 may add the information about the access right to the files in the backup of the set of files, thereby restoring the access right of the set of files. In some embodiments, the information about access right may include an access control list (ACL) information.

In some embodiments, the information about the backup of the set of files further includes an access path (hereinafter also referred to as a "source path") of the backup of the set of files on the client 140.

In some embodiments, the information about the backup of the set of files further includes an indication of a restoration type for indicating whether the file restoration process relates to a restoration of a single file or to a restoration of a folder.

In some embodiments, the client 140 may locally associate information items in the information about the backup of the set of files.

In some embodiments, the client 140 organizes the information items in the information about the backup of the set of files as a session database file. In some embodiments, the client 140 removes the source path from the session database file to generate a session information file. The client 140 transmits the information about the backup of the set of files to the virtual machine 110-1 by transmitting the session information file to the virtual machine 110-1. In some embodiments, the session database file has the same file name as the session information file.

Further referring to FIG. 2, the client 140 transmits (240) to the virtual machine 110-1 an instruction for executing the file downloading application to cause the file downloading application to be executed on the virtual machine 110-1.

In some embodiments, the client 140 may transmit to the virtual machine 110-1 the instruction for executing the file downloading application by calling an API for causing the virtual machine 110 to perform an operation so as to cause the file downloading application to be executed on the virtual machine 110-1. The API for causing the virtual machine 110 to perform an operation may be any suitable API provided by the data protection system.

Correspondingly, the virtual machine 110-1 receives the instruction for executing the file downloading application from client 140. Then, the virtual machine 110-1 executes (250) the file downloading application to download the backup of the set of files from the client 140 based on the information about the backup of the set of files. In some embodiments, the virtual machine 110-1 may download the backup of the set of files from the client 140 in accordance with any suitable network communication protocol. Examples of such network communication protocols include, but are not limited to, Hypertext Transfer Protocol (HTTP) and Hypertext Transfer Protocol Secure (HTTPS).

In some embodiments, in order to download the backup of the set of files from the client 140, the virtual machine 110-1 generates a request for downloading the backup of the set of files based on the information about the backup of the set of files. In turn, the virtual machine 110-1 transmits to the client 140 the request which includes the identification of the backup of the set of files.

For example, in embodiments where the virtual machine 110-1 communicates with the client 140 in accordance with the HTTP protocol, the request for downloading the backup of the set of files may be an HTTP GET request.

In embodiments where the client 140 transmits the information about the backup of the set of files to the virtual machine 110-1 by transmitting the above session information file to the virtual machine 110-1, the virtual machine 110-1 may generate a resource path in the HTTP GET request based on a file name of the session information file and the ID of the backup carried by the file. For example, the resource path in the HTTP GET request may be: the file name of the session information file/the ID of the backup of the set of files.

Upon receiving the request for downloading the backup of the set of files from the virtual machine 110-1, the client 140 determines the access path of the backup of the set of files on the client 140 based on the ID of the backup of the set of files in the request. For example, in an embodiment where the client 140 organizes the information items in the information about the backup of the set of files locally into a session database file, the client 140 may locally look up for the session database file with the file name based on the file name of the session information file in the request. Further, the client 140 may obtain, from the found identified session database file, an access path on the client 140 associated with the ID of the backup of the set of files.

Upon determining the access path of the backup of the set of files on the client 140, the client 140 reads the backup of the set of files via the access path. Then, the client 140 transmits to the virtual machine 110-1 a download response which includes the backup of the set of files. In some embodiments, the download response may be an HTTP GET response.

Upon receiving the backup of the set of files from the client 140, the virtual machine 110-1 stores the backup on the virtual machine 110-1 via the storage path indicated by the information about the backup of the set of files.

According to embodiments of the present disclosure, the client only needs to call the API for file transfer once in order to transmit the information about the backup of the set of files to be restored and the file downloading application to the virtual machine. The operating system of the virtual machine can download, by executing the file downloading application, from the client the backup of the files in the set of files to be restored. The client does not need to call the API for file transfer once for each of the files in the set of files. As such, it is possible to reduce the number of times of API calls, and improve the efficiency of restoring files. Table 1 below shows a performance comparison of the conventional solution with the embodiment of the present disclosure in terms of file restore time.

TABLE 1

| File size | File restore time of the conventional solution | File restore time of the embodiment of the present disclosure |
|---|---|---|
| 10M | 15 seconds | 7 seconds |
| 100M | 23 seconds | 9 seconds |
| 1G | 1462 seconds | 37 seconds |
| 10G | Over 3 hours | 141 seconds |

As can be seen from Table 1, the file restore time is greatly shortened by the embodiment of the present disclosure in the case of restoring a large file. The efficiency of file restoration is remarkably improved.

In addition, in the conventional solution, because the API for file transfer has to be called once for each of the files in order to perform file restoration on the virtual machine, file restoration is limited by the API. For example, calling an API for file transfer cannot restore symbolic link files, empty files, and access right information in files.

However, according to embodiments of the present disclosure, it is only necessary to call the API for file transfer once in order to transfer the information about the backup of the set of files to be restored and a file downloading application to the virtual machine. It is not necessary to call the API to transfer a backup of each file to be restored to the virtual machine. Thus, embodiments of the present disclosure are capable of breaking the limitations of APIs for file transfer. For example, according to embodiments of the present disclosure, symbol link files, empty files, and access right information in files can be restored.

In some embodiments, after the virtual machine 110-1 completes the downloading, the client 140 may cause the virtual machine 110-1 to remove the information about the backup and the file downloading application by transmitting an instruction to the virtual machine 110-1 so as to save the storage space of the virtual machine 110-1.

Figure 3:
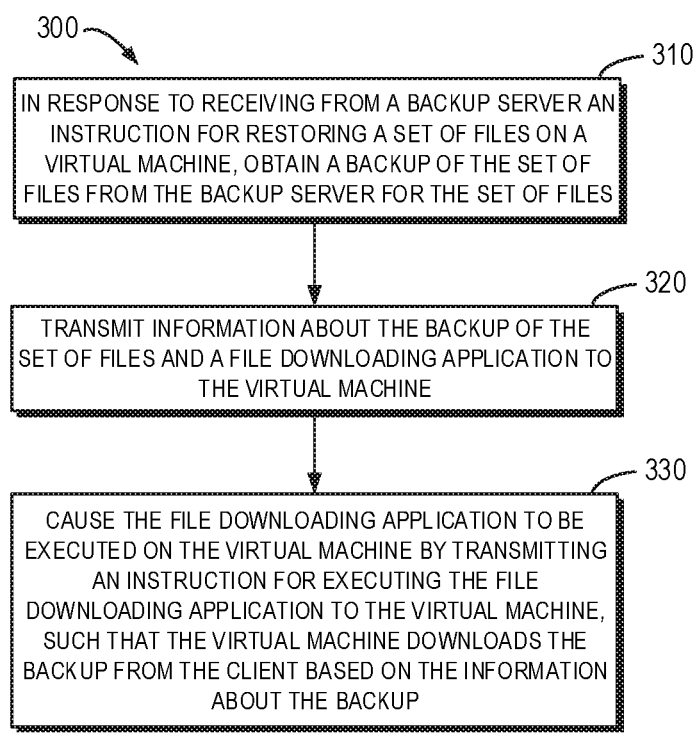
FIG. 3 illustrates a flow chart of a method of restoring files according to one or more embodiments of the present disclosure.

FIG. 3 illustrates a flow chart of a method 300 of restoring a file according to some embodiments of the present disclosure. For example, the method 300 may be performed by the client 140. It should be understood that the method 300 may also include additional steps not shown and/or the steps shown may be omitted, and the scope of the disclosure is not limited in this respect. For ease of discussion, the method 300 will be discussed in conjunction with FIG. 1 to restore the set of files on virtual machine 110-1 as an example.

At 310, in response to receiving an instruction for restoring a set of files on the virtual machine 110-1 from the backup server 130, the client 140 obtains a backup of the set of files from the backup server 130 for the set of files.

At 320, the client 140 transmits information about the backup of the set of files and a file downloading application to the virtual machine 110-1.

At 330, the client 140 causes the file downloading application to be executed on the virtual machine 110-1 by transmitting an instruction for executing the file downloading application to the virtual machine 110-1, such that the virtual machine 110-1 downloads the backup of the set of files from the client 140 based on the information about the backup of the set of files.

In some embodiments, the information about the backup of the set of files at least includes: an identification of the backup of the set of files, and a storage path of the backup of the set of files on the virtual machine 110-1.

In some embodiments, the method 300 further includes storing, at the client 140, the identification of the backup of the set of files in association with an access path of the backup on the client 140.

In some embodiments, the method 300 further includes: receiving, from the virtual machine 110-1, a request for downloading the backup of the set of files, the request comprising the identification of the backup of the set of files; determining the access path of the backup of the set of files on the client 140 based on the identification in the request; reading the backup of the set of files via the access path; and transmitting to the virtual machine 110-1 a download response which includes the backup of the set of files.

In some embodiments, the method 300 further includes: in response to completion of the downloading, causing the virtual machine 110-1 to remove the information about the backup of the set of files and the file downloading application.

Figure 4:
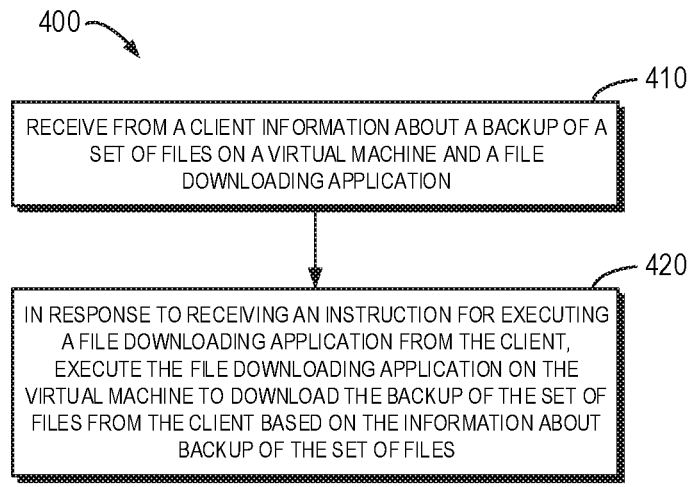
FIG. 4 illustrates a flow chart of a method of restoring files according to one or more other embodiments of the present disclosure.

FIG. 4 illustrates a flow chart of a method 400 of restoring a file according to some other embodiments of the present disclosure. For example, method 400 may be performed by the virtual machine 110-1. It should be understood that the method 400 may also include additional steps not shown and/or the steps shown may be omitted, the scope of the disclosure being not limited in this respect. For ease of discussion, method 400 will be discussed in conjunction with FIG. 1 to restore the set of files on the virtual machine 110-1 as an example.

At 410, the virtual machine 110-1 receives from the client 140 information about a backup of a set of files on virtual machine 110-1 and a file downloading application.

At 420, in response to receiving an instruction for executing the file downloading application from the client 140, executing the file downloading application on the virtual machine 110-1 to download the backup of the set of files from the client 140 based on the information about backup of the set of files.

In some embodiments, the information about the backup of the set of files at least includes: an identification of the backup of the set of files, and a storage path of the backup of the set of files on the virtual machine 110-1.

In some embodiments, executing the file downloading application on the virtual machine 110-1 includes: generating a request for downloading the backup of the set of files based on information about the backup of the set of files; transmitting the request to the client 140, the request comprising an identification of the backup of the set of files; receiving from the client 140 a download response which includes the backup of the set of files; and storing the backup of the set of files on the virtual machine 110-1 via the storage path.

In some embodiments, the method 400 further includes: in response to completion of the downloading, removing the information about the backup of the set of files and the file downloading application.

It should be understood that in the case that file restoration is performed for other virtual machines (e.g., virtual machine 110-N) than the virtual machine 110-1 in FIG. 1, the client 140 may perform the above method 300 for the other virtual machines.

It should be understood that the details of the embodiments of the present disclosure described above with reference to FIGS. 1 and 2 are also applicable to the methods 300 and 400 and thus will not be described again.

Figure 5:
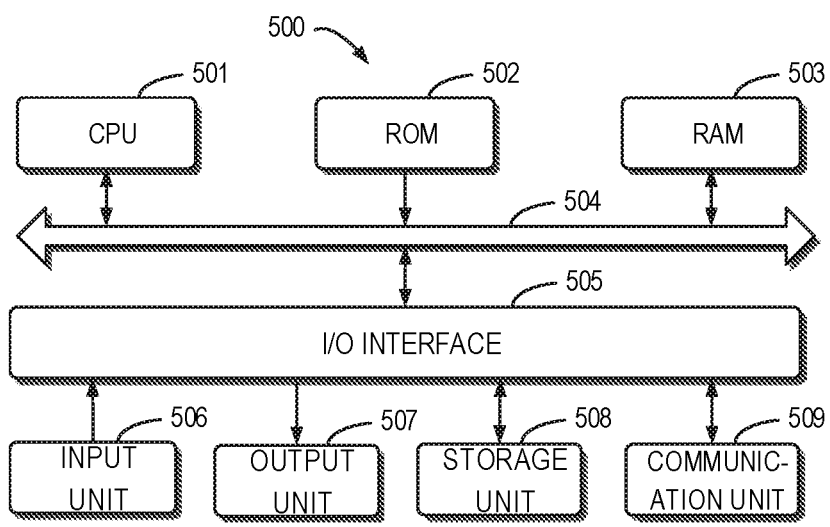
FIG. 5 shows a schematic block diagram of an apparatus that may be used to implement one or more embodiments of the present disclosure.

FIG. 5 shows a block diagram of an apparatus 500 that may be used to implement embodiments of the present disclosure. As shown in FIG. 5, the device 500 comprises a central processing unit (CPU) 501 that may perform various appropriate actions and processing based on computer program instructions stored in a read-only memory (ROM) 502 or computer program instructions loaded from a memory unit 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

Various components in the device 500 are connected to the I/O interface 505, comprising: an input unit 506 such as a keyboard, a mouse and the like; an output unit 507 comprising various kinds of displays and a loudspeaker, etc.; a memory unit 508 comprising a magnetic disk, an optical disk, and etc.; a communication unit 509 comprising a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., method 300, 400, may be executed by the processing unit 501. For example, in some embodiments, the method 300, 400 may be implemented as a computer software program that is tangibly embodied on a machine readable medium, e.g., the storage unit 508. In some embodiments, part or all of the computer program may be loaded and/or mounted onto the device 500 via ROM 502 and/or communication unit 509. When the computer program is loaded to the RAM 503 and executed by the CPU 501, one or more steps of the method 300, 400, 500 and/or 600 as described above may be executed.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

As used herein, the term "determining" covers a wide variety of actions. For example, "determining" may include operation, computing, processing, exporting, investigating, looking up (e.g., looking up in a table, database, or another data structure), ascertaining, and the like. Further, "determining" may include receiving (e.g., receiving information), accessing (e.g., accessing data in a memory), and the like. Further, "determining" may include parsing, choosing, selecting, establishing, and the like.

It should be noted that, the embodiments of the present invention can be implemented in software, hardware or the combination thereof. The hardware part can be implemented by a special logic; the software part can be stored in a memory and executed by a proper instruction execution system such as a microprocessor or a design-specific hardware. The normally skilled in the art may understand that the above apparatus and method may be implemented with a computer-executable instruction and/or in a processor controlled code, for example, such code is provided on a programmable memory or a data bearer such as an optical or electronic signal bearer.

In addition, although operations of the method of the present method are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution. It should also be noted that features and functions of two or more devices in accordance with the present disclosure may be embodied in one device. Conversely, the features and functions of one device described above can be further divided into multiple devices.

Although the present disclosure has been depicted with reference to a plurality of embodiments, it should be understood that the present invention is not limited to the disclosed embodiments. The present disclosure intends to cover various modifications and equivalent arrangements included in the spirit and scope of the appended claims.

We claim:

1. A method of restoring files, comprising:
   at a client,
      in response to receiving from a backup server an instruction for restoring a set of files on a virtual machine, mounting, by the client, a backup server storage device of the backup server, wherein the backup server storage device comprises a backup of the set of files;
      transmitting information about the backup and a file downloading application to the virtual machine, wherein the information about the backup comprises a target storage path of a storage on the virtual machine; and causing the file downloading application to be executed on the virtual machine by transmitting an instruction for executing the file downloading application to the virtual machine, such that upon execution of the file downloading application the virtual machine downloads the backup from the client based on the information about the backup.

2. The method according to claim 1, wherein the information about the backup further comprises:

an identification of the backup.

3. The method according to claim 2, further comprising:

storing, at the client, the identification of the backup in association with an access path of the backup on the client, wherein the access path is to the backup of the set of files stored on the backup server storage device.

4. The method according to claim 3, further comprising:

receiving, from the virtual machine, a request for downloading the backup, the request including the identification of the backup;

determining the access path of the backup on the client based on the identification in the request;

reading the backup via the access path; and transmitting, to the virtual machine, a download response including the backup.

5. The method according to claim 1, further comprising:

in response to completion of the downloading, causing the virtual machine to remove the information about the backup and the file downloading application.

6. An electronic device, comprising:

at least one processor; and at least one memory including computer program instructions, the at least one memory and the computer program instructions configured, with the at least one processor, to cause the device to perform a method, the method comprising:

in response to receiving from a backup server an instruction for restoring a set of files on a virtual machine, mounting, by the client, a backup server storage device of the backup server, wherein the backup server storage device comprises a backup of the set of files;

transmitting information about the backup and a file downloading application to the virtual machine, wherein the information about the backup comprises a target storage path of a storage on the virtual machine; and causing the file downloading application to be executed on the virtual machine by transmitting an instruction for executing the file downloading application to the virtual machine, such that upon execution of the file downloading application the virtual machine downloads the backup from the client based on the information about the backup.

7. The electronic device according to claim 6, wherein the information about the backup further comprises:

an identification of the backup.

8. The electronic device according to claim 7, wherein the method further comprises:

storing, at the client, the identification of the backup in association with an access path of the backup on the client, wherein the access path is to the backup of the set of files stored on the backup server storage device.

9. The electronic device according to claim 8, wherein the method further comprises:

receiving, from the virtual machine, a request for downloading the backup, the request including the identification of the backup;

determining the access path of the backup on the electronic device based on the identification in the request;

reading the backup via the access path; and transmitting, to the virtual machine, a download response including the backup.

10. The electronic device according to claim 6, wherein the method further comprises:

in response to completion of the downloading, causing the virtual machine to remove the information about the backup and the file downloading application.

11. A non-transitory computer readable medium comprising machine executable instructions, the machine executable instructions, when executed by a device, cause the device to perform a method, the method comprising:

in response to receiving from a backup server an instruction for restoring a set of files on a virtual machine, mounting, by the client, a backup server storage device of the backup server, wherein the backup server storage device comprises a backup of the set of files;

transmitting information about the backup and a file downloading application to the virtual machine, wherein the information about the backup comprises a target storage path of a storage on the virtual machine; and causing the file downloading application to be executed on the virtual machine by transmitting an instruction for executing the file downloading application to the virtual machine, such that upon execution of the file downloading application the virtual machine downloads the backup from the client based on the information about the backup.

12. The non-transitory computer readable medium according to claim 11, wherein the information about the backup further comprises:

an identification of the backup, and a storage path of the backup on the virtual machine.

13. The non-transitory computer readable medium according to claim 12, the method further comprising:

storing, at the client, the identification of the backup in association with an access path of the backup on the client, wherein the access path is to the backup of the set of files stored on the backup server storage device.

14. The non-transitory computer readable medium according to claim 13, the method further comprising receiving, from the virtual machine, a request for downloading the backup, the request including the identification of the backup;

determining the access path of the backup on the client based on the identification in the request;

reading the backup via the access path; and transmitting, to the virtual machine, a download response including the backup.

15. The non-transitory computer readable medium according to claim 11, the method further comprising:

in response to completion of the downloading, causing the virtual machine to remove the information about the backup and the file downloading application.

* * * * *